Nov. 4, 1969
E. A. PEARSON
3,475,786
TUBE CLOSING MACHINE
Filed Dec. 30, 1966
5 Sheets-Sheet 1
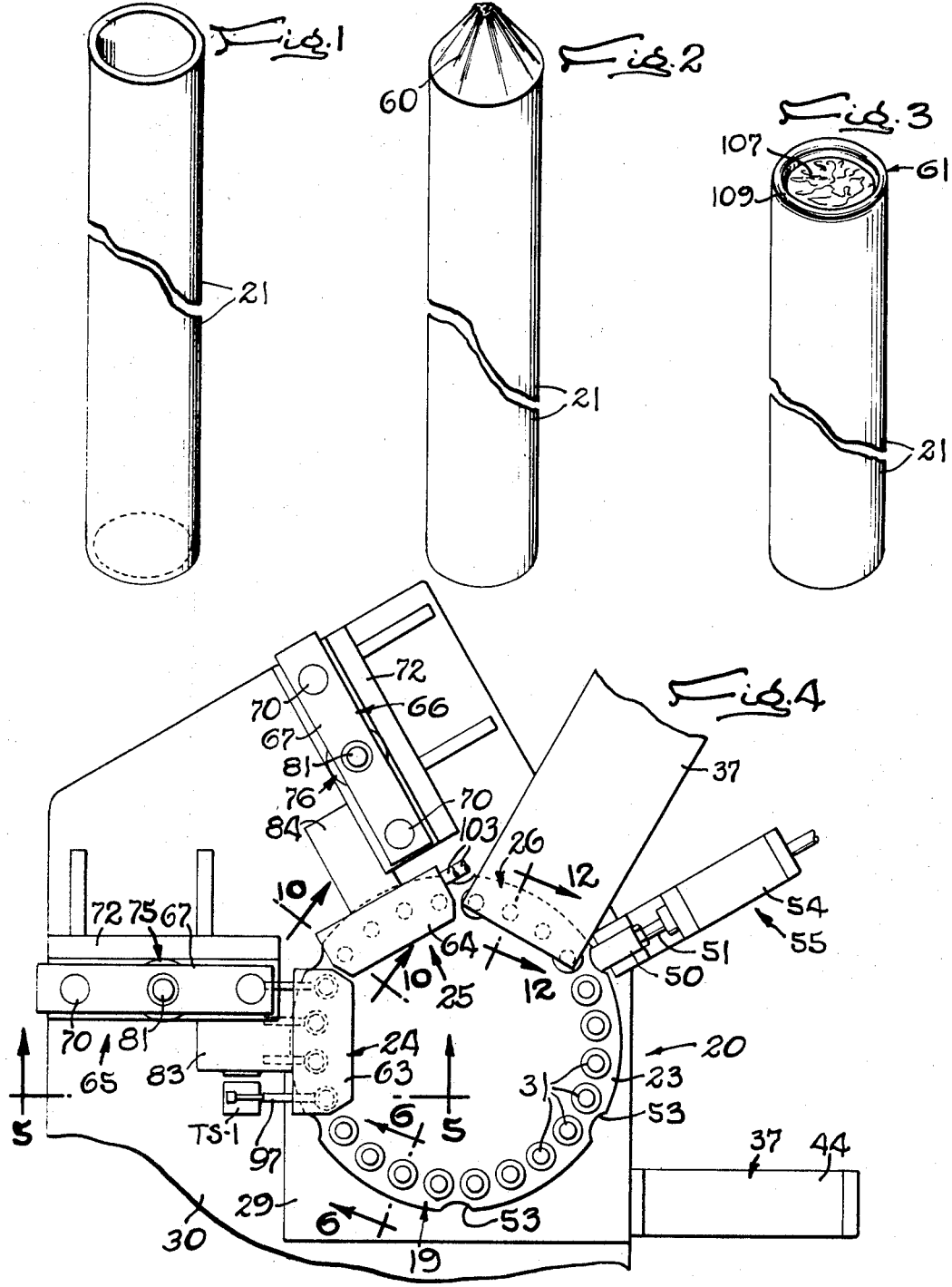
INVENTOR
Ernest A. Pearson
by Wolfe, Hubbard, Voit & Osann
ATTORNEYS INVENTOR
Ernest A. Pearson
ATTORNEY

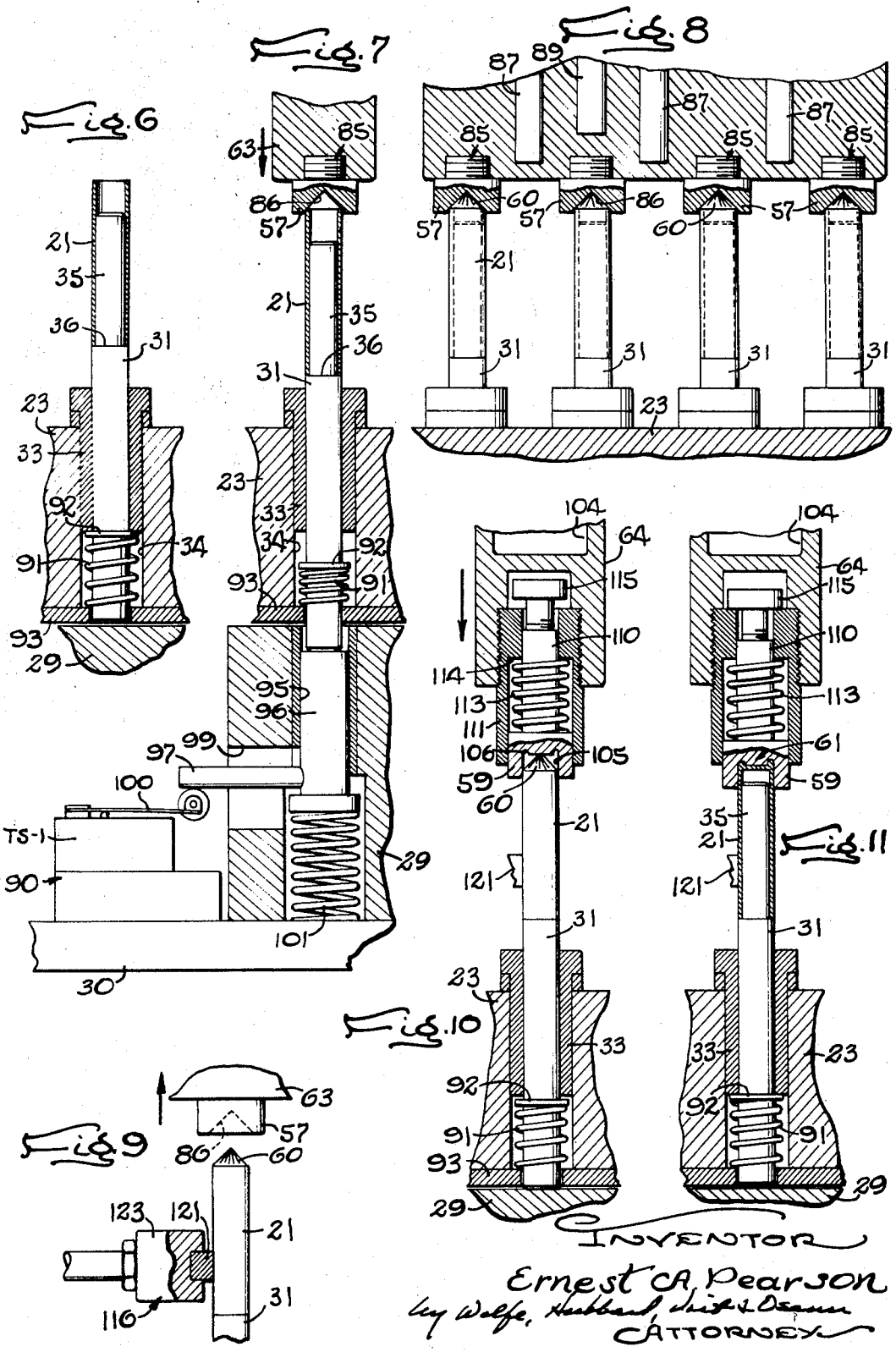

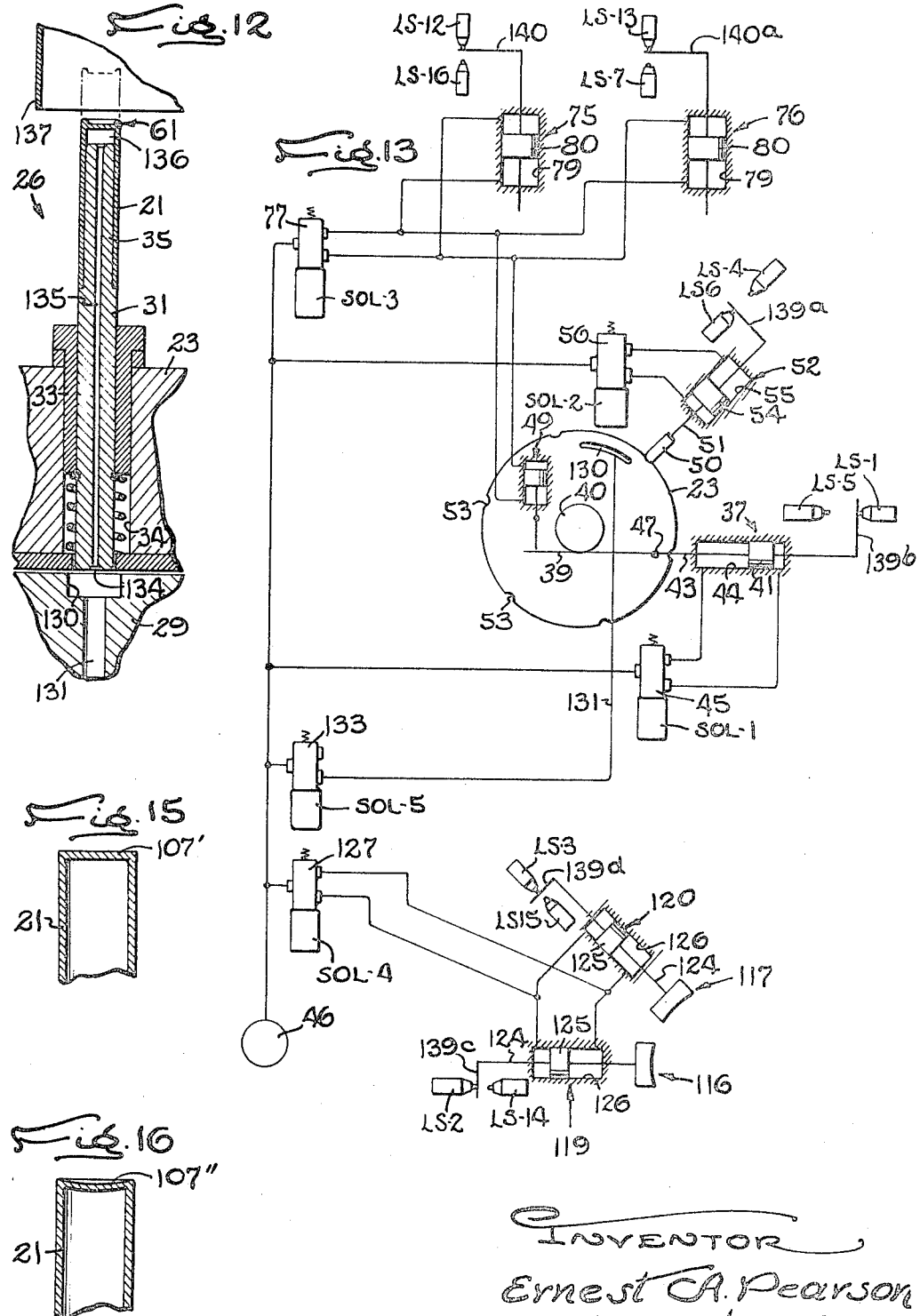

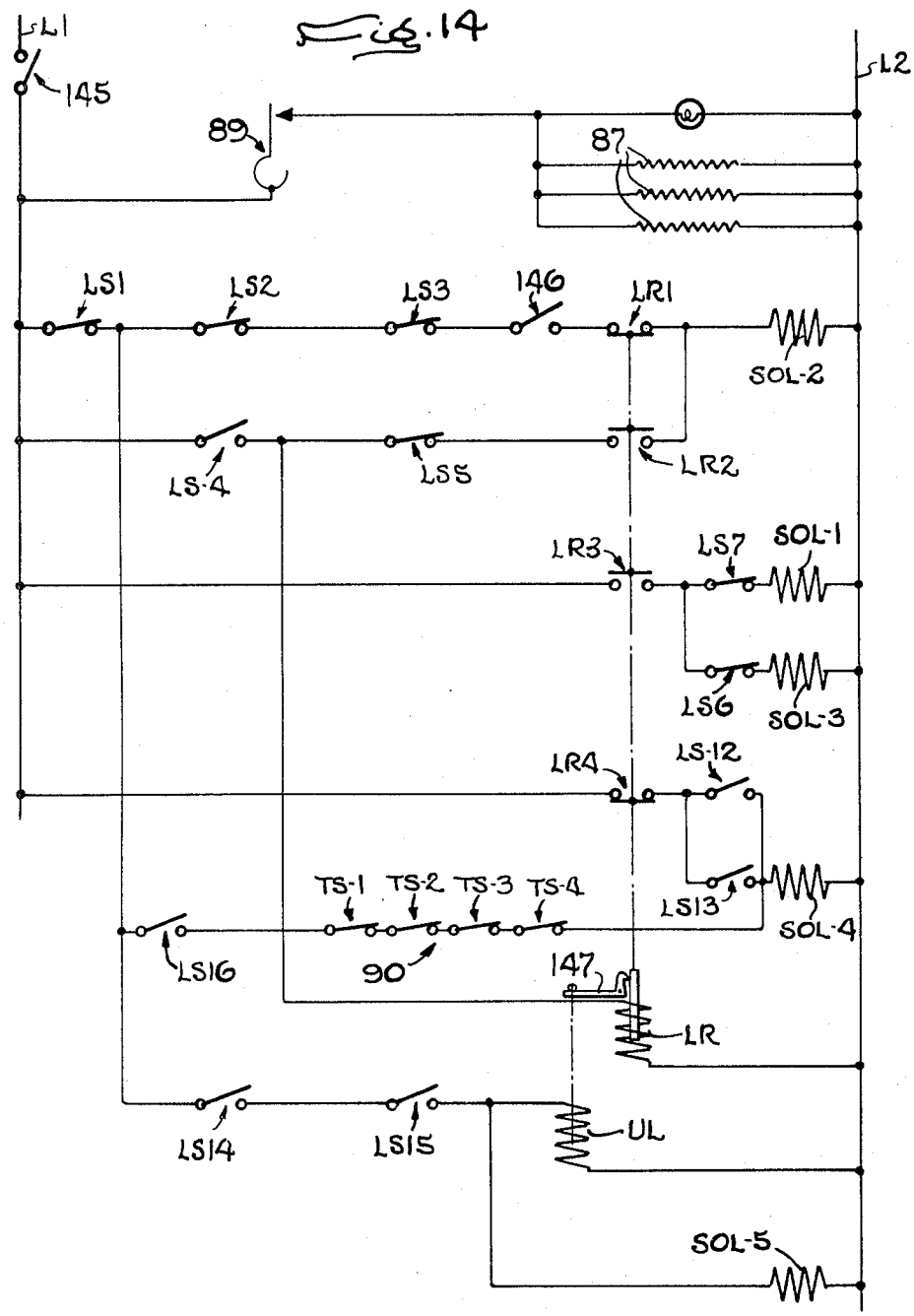

United States Patent Office
3,475,786
Patented Nov. 4, 1969

1

3,475,786
TUBE CLOSING MACHINE
Ernest A. Pearson, Rockford, Ill., assignor, by mesne assignments, to Medical Supply Company, Rockford, Ill., a corporation of Missouri
Filed Dec. 30, 1966, Ser. No. 613,379
Int. Cl. B29c 1/00
U.S. Cl. 18—5   10 Claims

ABSTRACT OF THE DISCLOSURE

The ends of a group of plastic tubes are shaped and sealed closed by heated forming dies which are lowered over and held in contact with the tube ends until the tubes soften and move upwardly to fill the die cavities. The upward movement of the tubes is sensed by limit switches which produce a signal causing retraction of the dies when all of the tubes in the group have moved upwardly. Clamps automatically move into engagement with the sides of the tubes just before retraction of the dies to prevent the tubes from sticking to and being pulled upwardly with the dies.

---

This invention relates to a machine for closing the ends of tubes formed of thermosetting material such as plastic so as to convert the tubes into containers particularly suitable for use as components in culture testing units, antiseptic applicators and related instruments employed by the medical profession. In the manufacture of such containers, a tube first is cut to length from an elongated piece of tubular plastic stock and then is loaded in an upright position on a carrier for indexing through one or more shaping stations. At these stations, forming dies lowered over the upper end of the tube soften and shape the plastic material to seal the tube end closed and form the finished container.

The primary object of the present invention to provide a new and improved machine of the above character for sealing the ends of a larger number of tubes in a shorter time with seals uniformly higher in quality than prior machines of the same general type.

Another object is to seal a group of tubes simultaneously and to retract the dies only after all of the tubes in the group have received seals of optimum quality.

A related object is to control the movement of the dies by sensing the condition of the seals being formed.

A further object is to prevent tubes mounted for endwise movement relative to the carrier from sticking to the dies and being pulled away from the carrier as the dies are retracted.

Still another object is to incorporate a novel pneumatic ejector in the machine for ejecting the tubes from the carrier when the closing operation is completed.

Other objects and advantages will become apparent from the following detailed description taken in connection with the accompanying drawings, in which FIGURE 1 is a perspective view of a tube before it is closed.

FIG. 2 is a view similar to FIG. 1 and showing the tube with the end partially closed.

FIG. 3 is a view similar to FIG. 1 and showing the tube in the form of a container with the end completely closed.

FIG. 4 is a fragmentary plan view of a tube closing machine embodying the novel features of the present invention.

FIG. 6 is an enlarged fragmentary cross-section taken substantially along the line 6—6 of FIG. 4.

2

Figure 5:
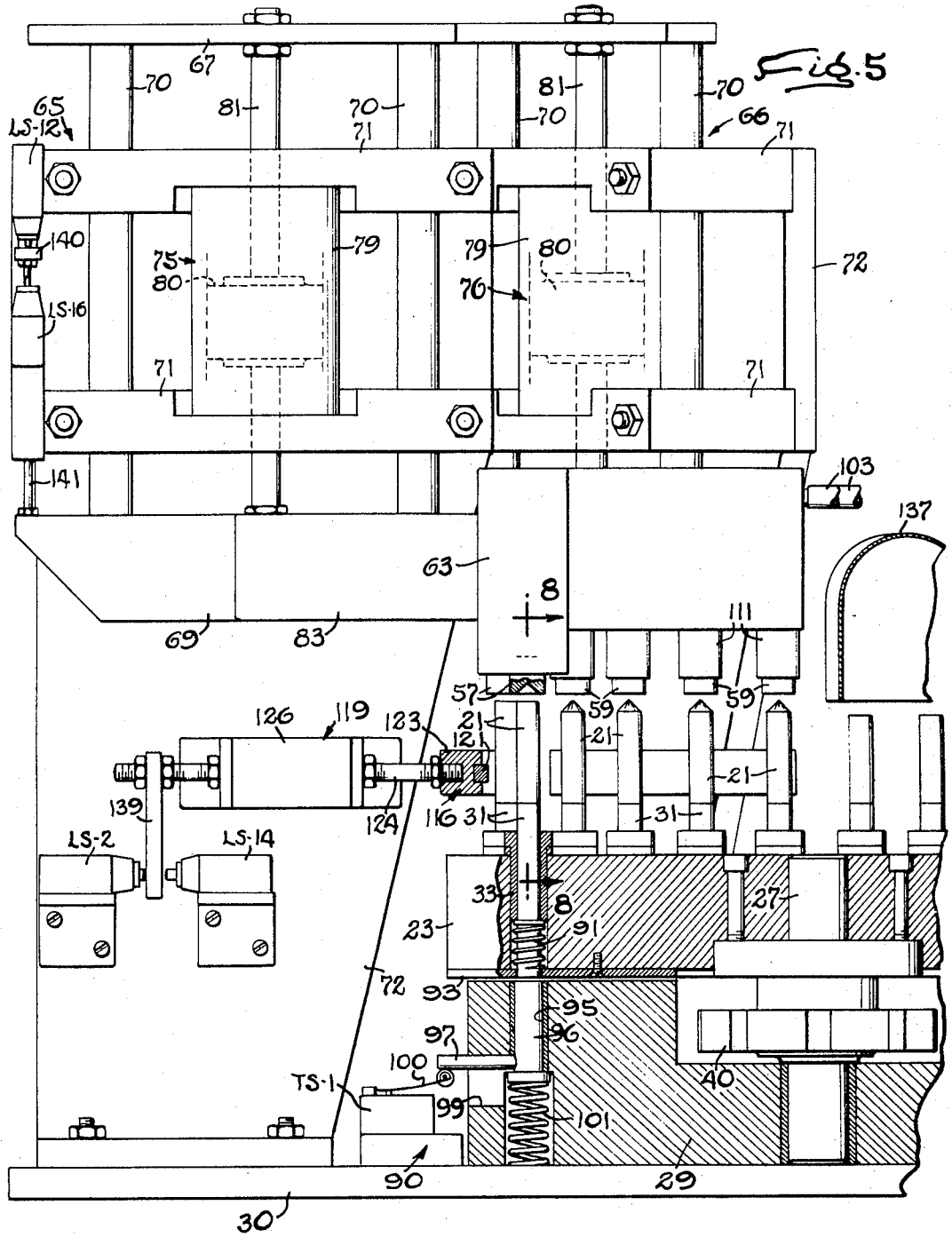
FIG. 5 is an enlarged fragmentary cross-section taken substantially along the line 5—5 of FIG. 4.

FIG. 7 is an enlarged view of a portion of FIG. 5 with parts being shown in moved positions.

FIG. 8 is an enlarged fragmentary cross-section taken substantially along the line 8—8 of FIG. 5 and showing the parts in moved positions.

FIG. 9 is an enlarged view of a portion of FIG. 5 with parts being shown in moved positions.

FIG. 10 is an enlarged fragmentary cross-section taken substantially along the line 10—10 of FIG. 4.

FIG. 11 is a view similar to FIG. 10 showing the parts in moved positions.

FIG. 12 is an enlarged fragmentary cross-section taken substantially along the line 12—12 of FIG. 4.

FIG. 13 is a schematic view and fluid circuit diagram of the machine.

FIG. 14 is a schematic diagram of the electrical circuit for controlling the operation of the machine.

FIGS. 15 and 16 are longitudinal sectional views of tubes with modified end seals.

As shown in the drawings for purposes of illustration, the invention is embodied in a tube closing machine 20 in which a succession of open-ended tubes 21 cut to length from an elongated piece of thermoplastic stock are loaded onto a carrier 23 in upright positions at a loading station 19 (FIG. 4) and are advanced step-by-step around a circular path through a forming station 24 where the upper ends of the tubes are softened and shaped preparatory to closing, a closing station 25 where the upper ends are sealed to form each tube into a container, and a discharge station 26 where the sealed tubes are ejected from the carrier. Tubes converted into containers in this manner often are used in the medical field as antiseptic applicators, culture tubes and specimen receptacles.

Preferably, the carrier 23 comprises a round horizontal table fast on a vertical shaft 27 (FIG. 5) which is journaled for rotation in a base 29 supported on a frame plate 30. Equally spaced around the table 23 is a series of twenty four upstanding mandrels 31 (FIG. 6) mounted in bushings 33 received in holes 34 extending through the table. Each mandrel is formed with a reduced upper end portion 35 over which a tube 21 is adapted to telescope loosely. The lower end of the tube rests on a shoulder 36 formed at the junction of the main body and the reduced portion of the mandrel, and the upper end of the tube projects slightly above the upper end of the mandrel.

Step-by-step advancement of the tubes 21 in a circular path through the stations 24 to 26 is achieved by an air-operated actuator 37 (FIGS. 4 and 13) fastened to the base 29 and acting through a ratchet 39 to index a ratchet wheel 40 (FIG. 5) keyed to the shaft 27. More specifically, the actuator includes a piston 41 (FIG. 13) connected to a rod 43 and slidable in opposite directions in a cylinder 44 in response to the admission of air to opposite ends of the cylinder through a valve 45 communicating with a pressure source 46 and controlled by a solenoid SOL–1. At its free end, the rod is pivotally connected by a pin 47 to the ratchet 39 which meshes with the ratchet wheel 40 to index the table 23 clockwise (FIG. 13) through one sixth of a revolution on each forward stroke of the piston rod. Thus, the tubes are advanced in groups of four so that four tubes are disposed in each station 24 to 26 each time the table dwells. To release the ratchet from the ratchet wheel on the return stroke of the piston rod 43, a double-acting pneumatic actuator 49 pivotally connected to the free end of the ratchet swings the latter about the pin 47 into and out of engagement with the wheel in timed relation with the reciprocation of the piston rod 43. As the table dwells between successive steps, it is locked against rotation by a stop 50 (FIGS. 4 and 13) fastened to the outer end of a piston rod 51 of an actuator 52 and formed with a convexly curved outer end which fits into concave and vertically extending notches 53 equally spaced around the periphery of the table. The rod 51 is connected to a piston 54 which reciprocates in a cylinder 55 to move the stop into and out of the detent notches as air is admitted into the cylinder through a valve 56 actuated by a solenoid SOL–2.

Herein, the upper ends of the tubes 21 are shaped and closed at the forming and closing stations 24 and 25 by forming and closing dies 57 and 59 (FIG. 5) each arranged in sets of four and lowered over the groups of tubes as the latter dwell in the stations. First, the upper ends of the tubes of each group are softened and shaped into the form of a substantially closed cone 60 (FIGS. 2 and 8) by the forming dies 57, and thereafter the plastic material of each cone is flattened as shown in FIGS. 3 and 11 by the closing dies 59 to form a substantially flat seal 61 at the upper end of the tube and thus convert the latter into a container. The four forming dies 57 are carried on the lower end of a vertically movable forming die head 63 (FIGS. 4, 5 and 8) disposed in the forming station 24 above the arcuate path of the tubes and are equally spaced from each other along the die head so as to be alined with a group of four tubes dwelling in the forming station. The four closing dies 59 are arranged similarly on the lower end of a vertically movable closing die head 64 which is positioned in the closing station 25 next to the forming die head 63. As a result, the forming dies 57 are alined with and move downwardly upon one group of tubes having completely open upper ends, and the closing dies are alined with and move downwardly upon the adjacent group of tubes having coned upper ends each time the table 23 dwells and the die heads are lowered.

The die heads 63 and 64 are mounted for up and down movement relative to the tubes 21 on vertically movable frames 65 and 66 (FIGS. 4 and 5) angularly spaced from each other and disposed outside of the path of the tubes. Each frame includes upper and lower cross bars 67 and 69 rigidly connected by a pair of parallel cylindrical rods 70 slidably journaled in vertically spaced stationary guide members 71. The latter are bolted to an upright plate 72 fastened to and projecting upwardly from the frame 30 disposed beneath the base 29. Up and down movement is imparted to the frames 65 and 66 as pressurized air is admitted into opposite ends of fluid-operated actuators 75 and 76 (see FIGS. 5 and 13), respectively, through a four-way valve 77 controlled by a solenoid SOL–3. Each actuator 75 and 76 includes a cylinder 79 connected between and rigid with the guide members 71 and slidably receiving a piston 80 which is disposed intermediate the ends of a rod 81 fastened to the upper and lower cross bars 67 and 69. The forming die head 63 is connected to the lower cross bar 69 of the frame 65 by an arm 83 (FIGS. 4 and 5), and the closing die head 64 is connected similarly to the lower cross bar 69 of the frame 66 by an arm 84 (FIG. 4) so that both die heads move upwardly and downwardly as the frames 65 and 66 are reciprocated in the guide members 71 by the actuators 75 and 76.

As shown most clearly in FIGS. 7 and 8, each forming die 57 is threaded into the lower end of the forming die head 63 as indicated at 85 and is formed with a downwardly opening cone-shaped cavity 86 having an open lower end slightly larger than the diameter of a tube and having upwardly sloping side walls defining a restriction smaller than the tube and terminating in a point at the upper end of the cavity. The dies 57 are heated by heating elements 87 (FIGS. 8 and 14) embedded in the forming head 63 and regulated by a thermostat 89. Accordingly, when the heated forming dies are lowered over a group of tubes dwelling in the forming station 24, the open upper end of each tube in the group is heated by one of the forming dies and is softened and shaped into the form of the cone 60 as shown in FIGS. 1 and 8. The softened plastic material thus is gathered and molded over the previously open ends of the tubes so that the tubes will be sealed completely after the closing dies 59 have been lowered to flatten the cones.

To achieve seals 61 of high quality at the ends of the tubes 21, it is necessary that the forming dies 57 remain lowered over the tubes long enough to heat the plastic to sufficiently high temperatures to flow into and fill the cone-shaped cavities 86 so as to accumulate enough material over the open ends of the tubes to close the openings. On the other hand, if the heated dies are left in contact with the tubes for too long a period, the plastic will become excessively soft and will flow downwardly within the tubes thus destroying the cones 60 or leaving irregular openings in the upper ends of the tubes.

In accordance with one aspect of the present invention, the forming dies 57 are held in contact with a group of tubes 21 until all of the tubes of the group have been softened sufficiently to fill the cavities 86, and then are retracted immediately as an incident to the last tube in the group reaching the desired degree of softness thereby to insure that the dies will raise only after all of the cones 60 are formed completely but before the cones become hot enough to melt. To these ends, the tubes are moved downwardly relative to the table 23 as the dies are lowered and, as the plastic softens, the tubes are urged upwardly into the cavities 86. The upward movement of the tubes is sensed by a control 90 (FIGS. 5, 7 and 14) which causes the dies 57 to retract immediately after the last tube in the group has moved upwardly sufficiently far into the overlying cavity to fill the latter and form the cone 60.

In the present instance, the up and down movement of the tubes 21 is accommodated by mounting the mandrels 31 for endwise sliding relative to the table 23. For this purpose, the mandrels are mounted slidably in the bushings 33 in the table and normally are urged upwardly to the position shown in FIGS. 5 and 6 by coil springs 91 contracted between washers 92 rigid with the mandrels and a plate 93 fastened to the underside of the table, the plate being formed with holes alined with the holes 34 in the table. The washers engage the lower ends of the bushings to limit the upward movement of the mandrels beyond the position shown in FIG. 6. To allow the mandrels and the tubes to move downwardly, four vertical holes 95 (only one of which is shown in FIGS. 5 and 7) are formed through the base 29 in the portion of the base disposed in the forming station 24. The holes 95 are spaced arcuately along the path of the tubes 21 in accordance with the spacing of the mandrels and thus underlie and are alined with a group of four of the holes 34 in the table 23 when the latter dwells in the forming station.

As a group of four tubes 21 are indexed into the forming station 24, the mandrels 31 and tubes are disposed in their uppermost positions as shown in FIGS. 5 and 6. Then, as the forming die head 63 is lowered, the cavities 86 in the forming dies 57 telescope downwardly over the tubes until the upper ends of the tubes engage the upwardly sloping side walls of the cavities (see FIG. 7) to prevent further movement of the die head relative to the tubes. As a result, continued downward movement of the forming die head causes the tubes and the mandrels to move downwardly as a unit so that the lower ends of the mandrels are forced downwardly into the holes 95 in the base 29 to the position shown in FIG. 7.

Movement of the mandrels 31 into the holes 95 in the base 29 causes downward movement of a group of plungers 96 (FIGS. 5 and 7) which actuate the control 90 for causing the forming dies 57 to retract when the cones 60 have been formed on the ends of the group of tubes dwelling in the forming station 24. Herein, the control comprises four normally closed switches TS–1, TS–2, TS–3, and TS–4 (see FIGS. 7 and 14) connected in series and each disposed along the outside of the base 29 adjacent one of the holes 95 in the base. Each plunger 96 is mounted slidably in one of the holes 96 and carries a horizontal finger 97 which projects outwardly through and moves upwardly and downwardly in a slot 99 formed through the base and opening into the hole 95. As the fingers move downwardly as a result of downward movement of the mandrels and the plungers, each finger engages a spring metal operator arm 100 of one of the switches, and the latter opens idly.

Shortly after the tubes 21 have been moved downwardly, the plastic begins to soften because of the heat applied by the forming dies 57. Accordingly, the contracted springs 91 expand and urge the mandrels 23 upwardly to force the softened plastic material of the tubes upwardly past the restrictions formed by the side walls of the cavities 86. The upward movement of the tubes continues until the cavities are filled completely with plastic and the cones 60 are fully formed.

As an incident to the upward movement of the mandrels 31, the plungers 96 are urged upwardly by coil springs 101 (FIGS. 5 and 7) disposed within the holes 95 and contracted between the lower ends of the plungers and the frame plate 30. Thus, the fingers 97 move upwardly and away from the operator arms 100 and the switches TS–1 to TS–4 and allow each switch to close when the associated tube has moved upwardly sufficiently far to fill the cavity 86. Closure of all of the serially connected switches produces a signal subsequently causing the valve 77 to shift into a position admitting air into the lower end of the cylinder 79 of the forming head actuator 75. As a result, the forming die head 63 is retracted leaving four tubes with coned upper ends dwelling in the forming station 24.

Under ideal conditions, each of the tubes 21 of a group would soften at a uniform rate and thus each would move upwardly and fill its respective die cavity 86 at the same time thus causing the switches TS–1 to TS–4 to close in unison. In actual practice, however, differences in temperatures of each of the four forming dies and variations in thickness and composition of the plastic tubes often result in one tube being softened and filling its cavity either more rapidly or more slowly than the other tubes. With the present arrangement, the forming die head 63 is not retracted until all of the tubes of a group have filled their cavities completely and have moved upwardly far enough to close all of the switches. Accordingly, the forming dies 57 remain in contact with the tubes until each is formed with a perfect cone 60 and then are retracted immediately so as to avoid melting the cones. By controlling movement of the forming dies by sensing the condition of the plastic being molded, a large number of tubes can be sealed at a rapid rate with seals of uniformly high quality.

After the forming die head 63 has been retracted, the group of tubes 21 with softened and coned upper ends is indexed to the closing station 25, and the closing dies 59 are lowered to flatten the cones 60 and form the seals 61. Preferably, the closing dies are cooled by cooling water circulated through lines 103 (FIG. 5) leading into and out of a chamber 104 (FIG. 10) formed in the closing die head 64. Each closing die is formed with a downwardly opening cavity 105 which is just larger than the upper end of a tube and which terminates in a circumferential groove 106 at its upper end. Accordingly, the final seal 61 at the end of each tube is formed with a depressed central panel 107 (FIG. 3) encircled by an upwardly offset peripheral rim 109. Alternatively, the seal may be defined solely by a flat panel 107' (FIG. 15) or by a downwardly bowed panel 107" (FIG. 16) by changing the configuration of the cavity 105 in each closing die 59.

To flatten the cone 60 at the ends of the tubes 21 without buckling or wrinkling the heated plastic material just below the cones, the closing dies 59 are spring-urged against the cones to depress the latter at a controlled rate rather than by a sharp impact. For this purpose, each closing die is carried at the lower end of an elongated shank 110 (FIG. 10) and is mounted slidably in a sleeve 111 threaded into the lower end of the forming die head 64. Normally, the closing die is urged downwardly away from the closing die head to the position shown in FIG. 11 by a relatively weak coil spring 113 encircling the shank and contracted between the upper end of the die and a shoulder 114 formed by counterboring the sleeve. A button 115 on the upper end of the shank engages the upper end of the sleeve to limit the downward movement of the closing die.

As the closing die head 64 is lowered over the group of coned tubes 21 dwelling in the closing station 25, the closing dies 59 telescope over and engage the upper ends of the cones 60 and are forced upwardly into the cylinders 111 against the action of the springs 113 (see FIG. 10). At the same time, the tubes and mandrels 31 are forced downwardly a fraction of an inch until the lower ends of the mandrels engage the base 29, the downward movement of the mandrels causing the springs 91 to contract. As a result, the soft cones 60 are flattened as the dies are urged downwardly against the cones by the springs 113 and as the tubes are urged upwardly into the cavities by the springs 91. With this arrangement, the rate that each cone is flattened is correlated with and controlled by the particular thickness and composition of the individual tube and does not occur so rapidly so as to buckle the tube. After the cones have been flattened, the closing die head 64 is retracted by the actuator 76.

In accordance with another aspect of the present invention, the tubes 21 are clamped on and prevented from moving relative to the mandrels 31 just before the die heads 63 and 64 are retracted thereby to prevent the plastic tubes from sticking to the dies 57 and 59 and being pulled endwise off of the mandrels as the die heads are raised. To these ends, novel retarders 116 and 117 (FIGS. 5, 9 and 12) move into engagement with the sides of each group of tubes dwelling in the forming and closing stations 24 and 25 just after the tubes have filled the cavities 86 and 105 and have completed their upward endwise movement, remain in engagement with the tubes as the die heads are raised, and then are retracted away from the tubes just before the table 23 is indexed so as to leave the tubes free for movement to the next succeeding station.

Herein, the retarder 116 is disposed in the forming station 24 and outside of the path of the tubes 21 to engage tubes dwelling in that station, and the retarder 117 is disposed similarly in the closing station 25 to prevent upward movement of the group of tubes with completed seals 61. The retarders 116 and 117 are moved into and out of engagement with the sides of the tubes by double-acting pneumatic actuators 119 and 120, respectively, (see FIGS. 5 and 13) each fastened to one of the upstanding frame plates 72 (FIG. 5). Each retarder includes a band 121 of friction material arcuately curved in accordance with the curvature of the tube path and fastened to a similarly curved shoe 123. Each actuator 116 and 117 comprises a rod 124 connected at one end to the shoe and carried by a piston 125 (FIG. 13) slidable in a cylinder 126.

After the tubes 21 have filled the cavities 86 and 105 and just before the die heads 63 and 64 are retracted, air is admitted into the cylinders 125 through a valve 127 (FIG. 13) controlled by a solenoid SOL–4 thereby to shift the bands 121 of friction material into engagement with the sides of the dwelling tubes. Thus, the tubes are prevented from being pulled off of the ends of the mandrels 31 even though the heated plastic material may have stuck to the dies 57 and 59. After the heads have been raised, the valve 127 is shifted to retract the bands away from the tubes to leave the latter free for indexing.

The present invention also contemplates a novel pneumatic ejector for ejecting the tubes 21 automatically from the table 23 after the seals 61 have been formed. Herein, the ejector comprises a manifold 130 (FIG. 13) communicating with the pressure source 46 and adapted to direct a blast of air upwardly through the mandrels 31 to blow the tubes off of the upper ends of the mandrels at the discharge station 26.

As shown in FIGS. 12 and 13, the manifold 130 comprises an arcuately curved slot formed in the portion of the base 29 disposed in the discharge station 26. The slot 130 communicates with the pressure source 46 through a line 131, with the flow of air to the slot being controlled by a valve 133 actuated by a solenoid SOL–5. At its upper end, the slot 130 communicates with four upwardly opening inlet ports 134 (FIG. 12) formed in the lower ends of the mandrels 31 and adapted to register with the slot when the table 23 dwells.

After a group of tubes 21 closed with seals 61 have been indexed to the discharge station 26, pressurized air is admitted into the slot 130 and through the inlet ports 134. The blast of air flows upwardly through elongated passages 135 (FIG. 12) extending vertically through the mandrels 31 and communicating with the inlet ports. Each passage opens out of the upper end of the mandrel, and thus a blast of air is injected into a chamber 136 formed between the tube seal 61 and the upper end of the mandrel. As a result, the tubes are blown upwardly off of the mandrels by the pressurized air and are ejected automatically from the table 23. A downwardly opening hood 137 (FIGS. 4 and 5) overlies the path of the tubes at the discharge station to guide the tubes into a transfer receptacle (not shown) as they are blown off of the mandrels.

AUTOMATIC OPERATION AND THE CONTROL CIRCUITS

In general, the operation of the novel tube closing machine may be summarized as follows. Assuming that a group of tubes 21 with coned upper ends are dwelling in the forming station 24 and that tubes with completely sealed upper ends are dwelling in the closing station 25, the table 23 first is indexed through one step to advance a new group of tubes with open ends to the forming station, advance the tubes with coned upper ends to the closing station, and advance the tubes with the sealed upper ends to the discharge station 26. Thereafter, the forming dies 57 are lowered to cone the upper ends of the open tubes dwelling in the forming station, and the closing dies 59 are lowered simultaneously to seal the coned tubes dwelling in the closing station. At the same time, the completed tubes in the discharge station are ejected from the table 23 by a blast of air directed through the manifold 130. Immediately after all of the tubes in the forming station have moved upwardly into the forming die cavities 86, the retarders 119 and 120 are extended into engagement with the sides of the tubes in the forming and closing stations to prevent the tubes from sticking to the dies 57 and 59. The dies then are retracted upwardly, and thereafter the retarders are retracted away from the tubes. Finally, the table 23 again is indexed to advance the tubes another step and begin another cycle.

Typical electrical and pneumatic circuitry for controlling the above-described operation of the tube closing machine is shown in FIGS. 13 and 14. In describing the circuitry and the detailed operation, reference will be made to various limit switches which are actuated by movement of the machine elements. One example of the physical arrangement of the limit switches is shown in FIG. 5 in which limit switches LS–2 and LS–14 fastened to one of the frame plates 72 are opened and closed by an operator arm 139 depending from and reciprocating with the rod 124 of the retarder actuator 119. A second type of arrangement is illustrated by the limit switches LS–12 and LS–16 (FIG. 5) which are mounted on the stationary guide members 71 of the die head frame 65 and which are actuated by an operator arm 140 extending horizontally from a vertical rod 141 projecting upwardly from the lower cross bar 69 of the movable frame 65. Each of the valves in the pneumatic circuit is of the type which is shifted in one direction upon energization of its respective solenoid and then is shifted in the opposite direction by a spring as the solenoid is deenergized.

When the electric control circuit is deenergized, the various switches are positioned as shown in FIG. 14. With the die heads 63 and 64 retracted, the table 23 dwelling and the mandrels 31 loaded with tubes, an on-off switch 145 is closed manually to complete a circuit to the forming die heaters 87 through the thermostat 89 and across two electric power lines L1 and L2 connected to a power source (not shown). A manually operated start-stop switch 146 is closed to energize solenoid SOL–2 through limit switches LS–1, LS–2 and LS–3 and a relay-actuated switch LR–1. The solenoid SOL–2 shifts the valve 56 which operates the actuator 52 to retract the locking stop 50 from one of the detent notches 53 in the table 23. As the locking stop retracts, a limit switch LS–6 is opened idly, and a limit switch LS–4 is closed by an operator arm 139a to energize a latch relay LR which opens switches LR–1 and LR–4 and closes switches LR–2 and LR–3, these switches then being maintained mechanically in their respective positions by a latch 147. Switch LR–1 simply opens idly while closure of switch LR–2 maintains the solenoid SOL–2 energized through the now closed limit switch LS–4 and a limit switch LS–5.

Closure of switch LR–3 energizes solenoid SOL–1 through a limit switch LS–7 to shift the valve 45 thereby causing the actuator 37 to index the table 23 one step by means of the ratchet 39. At the completion of the index, an operator arm 139b opens switch LS–1 idly and opens switch LS–5 to deenergize solenoid SOL–2 so that the spring-shifted valve 56 causes the actuator 52 to extend the locking stop 50 into the next one of the detent notches 53 thus locking the table 23 in the indexed position.

As the locking stop 50 extends, the limit switch LS–4 is re-opened by the operator arm 139a to deenergize the latch relay LR, but the switches LR–1 to LR–4 are maintained mechanically in their instant positions by the latch 147. When the locking stop 50 seats, the operator arm 139a closes the limit switch LS–6 to energize the solenoid SOL–3 through now closed switch LR–3, thus shifting the valve 77 and admitting pressure fluid to the actuators 75 and 76 to lower the forming and closing die heads 63 and 64 over the dwelling tubes 21. At the same time, pressure fluid is directed into the actuator 49 through the valve 77 to swing the ratchet 39 counterclockwise about the pin 47 and away from the ratchet wheel 40. As the die heads lower, the operator arm 140 closes the limit switch LS–12 idly, and an operator arm 140a on the frame 66 closes a limit switch LS–13 idly. As an incident to the lowering of the die heads, the tubes 21, the mandrels 31 and the plungers 96 are moved downwardly so that the operating fingers 97 open the control swiches TS–1 to TS–4 idly. In addition, the operator arm 140 closes the limit switch LS–16, and the operator arm 140a opens the limit switch LS–7 as the die heads reach their lowermost positions. Opening of the switch LS–7 deenergizes the solenoid SOL–1 thereby causing the valve 45 to shift so that the actuator 37 retracts the rachet 39 into position for the next indexing step. As an incident to retraction of the ratchet, the operator arm 139b closes limit switches LS–1 and LS–5 preparatory to the next cycle.

As the plastic material of the tubes 21 dwelling in the forming station 24 begins to soften, the switches TS–1 to TS–4 of the control 90 are closed in response to the upward movement of the tubes into the cavities 86. When the last of the four tubes has moved upwardly to close the last of the control switches, the solenoid SOL–4 is energized by a circuit completed through switches TS–1 to TS–4 and through the now closed limit switches LS–1 and LS–16. Accordingly, the valve 127 is shifted and the actuators 119 and 120 are energized to shift the retarders 116 and 117 into clamping engagement with the tubes 21 prior to the die heads 63 and 64 being raised. As the retarders are moved into clamping engagement with the tubes, an operator arm 139c on the retarder actuator 119 first opens the limit switch LS–2 and then closes the limit switch LS–14. Similarly, an operator arm 139d on the retarder actuator 120 opens the limit switch LS–3 and closes a limit switch LS–15. As a result, the eject solenoid SOL–5 is energized by a circuit through switches LS–1, LS–14 and LS–15 and shifts the valve 133 thereby causing a blast of air to be injected into the manifold 130 for ejecting the tubes 21 dwelling in the discharge station 26.

In addition, an unlatch coil UL is energized through the same circuit and shifts the latch 147 to permit latch relay switches LR–1 and LR–4 to close and switches LR–2 and LR–3 to open. The switch LR–1 closes preparatory to the next cycle, and the switch LR–2 opens idly. Closure of the switch LR–4 completes a circuit to solenoid SOL–4 through now closed limit switches LS–12 and LS–13 to maintain the retarders 119 and 120 in clamped engagement with the tubes. As LR–3 opens, the solenoid SOL–3 is deenergized and allows valve 77 to shift thereby causing the actuators 75 and 76 to raise the die heads 63 and 64. At the same time, the actuator 49 swings the ratchet 39 clockwise about the pin 47 and back into engagement with the teeth of the ratchet wheel 40. When the die heads begin to raise, the operator arms 140 and 140a open limit switch LS–16 and close limit switch LS–7 preparatory to the next cycle. As the die heads reach their elevated positions, operator arms 140 and 140a open limit switches LS–12 and LS–13 thereby deenergizing the solenoid SOL–4 so that the valve 127 shifts to cause the actuators 119 and 120 to retract the retarders 116 and 117 away from the tubes 21.

The limit switches LS–14 and LS–15 are opened by the operator arms 139c and 139d as the retarders are retracted thereby to deenergize the unlatch coil UL. Finally, the arms 139c and 139d close limit switches LS–2 and LS–3 to energize the locking stop solenoid SOL–2 through limit switches LS–1 to LS–3, start-stop switch 146 and latch relay switch LR–1 to initiate another cycle of operation.

From the foregoing, it will be apparent that the new and improved machine of the present invention is very rapid in operation since several tubes ar sealed simultaneously. Moreover, the dies 57 are left in contact with the tubes long enough to insure the formation of high quality seals, and yet are retracted as soon as all of the seals are formed to avoid delaying the operation of the machine and to avoid destroying the newly formed seals.

I claim as my invention:

1. In a machine for shaping the ends of tubes formed of thermosetting material, the combination of, a carrier supporting groups of spaced upright tubes for endwise bodily movement and operable to move the groups step-by-step along a predetermined path through a forming station with dwell between successive steps, a die head positioned in said forming station and including a series of downwardly opening cavities alined with said path and spaced from each other in accordance with the spacing of the tubes within a group, each of said cavities having an open lower end slightly larger than the upper end of a tube and having side walls sloping upwardly and toward each other to define a restriction smaller than the upper end of a tube, said head being mounted for movement between an elevated position in which said cavities are disposed above the level of the tubes and a lowered position in which the open ends of the cavities telescope over and the side walls engage the upper ends of a group of tubes dwelling in said forming station, means for moving said head into said lowered position each time a group of tubes dwells in said forming station whereby said side walls engage the tubes and force the latter downwardly relative to said carrier, resilient elements mounted beneath the tubes and urging the latter upwardly into said cavities and against said side walls, a heater associated with said die head and operable to soften the ends of the tubes in said cavities whereby the softened ends flow upwardly past said restrictions and the tubes move upwardly under the urging of said resilient elements, a control operable to sense such upward movement and to produce a signal when all of the tubes have moved upwardly to a predetermined level, and mechanism for moving said head to said elevated position in response to the signal from said control.

2. A machine as defined in claim 1 further including power mechanism intermittently advancing said carrier to move the groups of tubes step-by-step along said path, and means responsive to the movement of said head toward said elevated position for controlling said power mechanism whereby the latter advances the carrier only when the head is disposed above the level of the tubes.

3. A mechanism as defined in claim 1 further including a retarder operable to engage the sides of the tubes in said forming station when said head is in said lowered position, and means responsive to the return of said head to said elevated position for retracting said retarder away from the sides of the tubes.

4. A mechanism as defined in claim 1 further including power mechanism for intermittently advancing said carrier to move the groups of tubes step-by-step along said path, a retarder operable to engage the sides of the tubes in said forming station after said head has moved to said lowered position, means responsive to the return of said head to said elevated position for retracting said retarder away from the sides of the tubes, and means responsive to the retraction of said retarder for controlling said power mechanism whereby the latter advances the carrier only when the head is disposed above the level of the tubes and the retarder is retracted away from the sides of the tubes.

5. A machine as defined in claim 1 in which said carrier comprises a rotatable table having a series of spaced upright holes therethrough, and mandrels received in said holes for up and down sliding movement relative to said carrier and adapted to telescope within said tubes to support the latter.

6. A machine as defined in claim 5 further including a base underlying said table and having a series of holes disposed in said forming station and alined with said path, the holes in said base registering with at least two of the holes in said table when a group of tubes dwells in said forming station, said mandrels moving into said holes in said base as the tubes are forced downwardly by said side walls and moving out of said holes in said base as the tubes are forced upwardly by said resilient elements, and said control having operators disposed adjacent said holes in said base and actuated by the movement of said mandrels.

7. A machine as defined in claim 1 in which said carrier comprises a table mounted on a base underlying the table and operable to advance the tubes through a discharge station positioned along said path and spaced from said forming station, a series of upright mandrels on said table each being formed with an elongated passage opening out of its upper end, each of said mandrels being adapted to telescope within a tube and support the latter on the table, a manifold positioned in said discharge station and communicating with said passages when the tubes are advanced to the discharge station, and an air pressure source communicating with said manifold and operable to inject a blast of air into said passages thereby to eject the tubes from the mandrels.

8. In a machine for shaping the ends of tubes formed of thermosetting material, a member supporting a tube in an upright position for endwise bodily movement, a die head having a downwardly opening cavity alined with the tube, said cavity having an open lower end slightly larger than the upper end of the tube and having side walls defining a restriction smaller than the upper end of the tube, said head being mounted for movement between an elevated position in which said cavity is disposed above the upper end of the tube and a lowered position in which the open end of the cavity is telescoped over and the side walls are engaged with the upper end of the tube, means for moving said head into said lowered position whereby said side walls engage the tube and force the latter downwardly, a resilient element energized by such downward movement and urging the tube back upwardly into said cavity, a heater associated with said head and operable to soften the end of the tube in said cavity whereby the softened end flows upwardly past said restriction and the tube moves upwardly under the urging of said resilient element, a control actuated by the upward movement of the tube and operable to produce a signal after the tube has moved upwardly to a predetermined level, and mechanism for moving said head to said elevated position in response to the signal from said control.

9. In a machine for shaping the ends of tubes formed of thermosetting material, the combination of, a rotatable table, means on said table for holding a series of tubes in an upright position while leaving the tubes free for endwise bodily movement, mechanism for intermittently rotating said table thereby to advance the tubes step-by-step along a circular path through a forming station with dwells between successive steps, a die head positioned in said forming station and mounted for movement between an elevated position above the level of the tubes and a lowered position in engagement with the upper ends of the tubes, an actuator for moving said head between said positions in timed relation with the rotation of said carrier whereby the head first engages and shapes the ends of tubes dwelling in said forming station and then moves upwardly away from the tubes to leave the latter free for advancement along said path, a retarder operable to engage the sides of tubes dwelling in said forming station to restrain upward endwise movement of the tubes as said head moves to said elevated position, and means for moving said retarder out of engagement with the tubes after said head has moved from said lowered position to said elevated position and before the tubes have been advanced from said forming station.

10. A machine as defined in claim 9 in which said retarder includes a member movable laterally of said path and formed with one side arcuately curved in accordance with the curvature of the path to engage a group of tubes simultaneously.

References Cited
UNITED STATES PATENTS

| | | |
|---|---|---|
| 2,788,544 | 4/1957 | Voumard et al. |
| 2,903,746 | 9/1959 | Eduhamel et al. |
| 2,983,959 | 5/1961 | Shapero et al. |
| 3,244,788 | 4/1966 | Michel et al. |
| 3,382,533 | 5/1968 | Fyfe et al. |

FOREIGN PATENTS 163,480   6/1955   Australia.

WILBUR L. McBAY, Primary Examiner

U.S. Cl. X.R.
18—19, 20; 72—367; 113—120